(No Model.)

D. M. HYLAND.
UNDERGROUND CONDUIT.

No. 411,595. Patented Sept. 24, 1889.

Witnesses.
Ella Edler
Geo. R. Parker.

Inventor.
David M. Hyland.
By George A. Barton
Attorney.

(No Model.)  2 Sheets—Sheet 2.

D. M. HYLAND.
UNDERGROUND CONDUIT.

No. 411,595. Patented Sept. 24, 1889.

Witnesses.
Ella Edler
Geo. R. Parker.

Inventor.
David M. Hyland.
By George H. Benton
Attorney

UNITED STATES PATENT OFFICE.

DAVID M. HYLAND, OF CHICAGO, ILLINOIS, ASSIGNOR OF ONE-HALF TO JOHN P. BARRETT, OF SAME PLACE.

UNDERGROUND CONDUIT.

SPECIFICATION forming part of Letters Patent No. 411,595, dated September 24, 1889.

Application filed March 1, 1889. Serial No. 301,611. (No model.)

*To all whom it may concern:*

Be it known that I, DAVID M. HYLAND, a citizen of the United States, residing at Chicago, in the county of Cook and State of Illinois, have invented a certain new and useful Improvement in Underground Conduits for Electric Conductors, (Case 1,) of which the following is a full, clear, concise, and exact description, reference being had to the accompanying drawings, forming a part of this specification.

My invention relates to systems of underground-conduits for electric wires, and its object is to provide for removing from such conduits any harmful gases that may be present.

As is well-known, when cables—as, for example, those provided with a sheathing of lead—are laid in conduits in cities the lead is sometimes attacked by the chemical action of gases which are found present, especially in cities. Illuminating-gas, as well as acetic acid and other compounds usually included under the general name of "sewer-gas," have often caused trouble, in addition to damaging the cables, by getting into buildings with which the conduits are necessarily connected.

My invention generally, then, comprises a means of relieving the underground-conduits from all objectionable gases, whether harmful to the cables or dangerous or objectionable when introduced into buildings.

My invention consists, speaking generally, in a chamber at the end of a cable, tunnel, or conduit entering a building, through the side or walls of which the cables are carried for distribution, this chamber being provided with an air-inlet and a vent connected with a flue, and so arranged that all objectionable gases coming through the tunnel will be carried off through the flue without being disseminated through the building.

My invention is illustrated in the accompanying drawings, in which—

Figure 1:
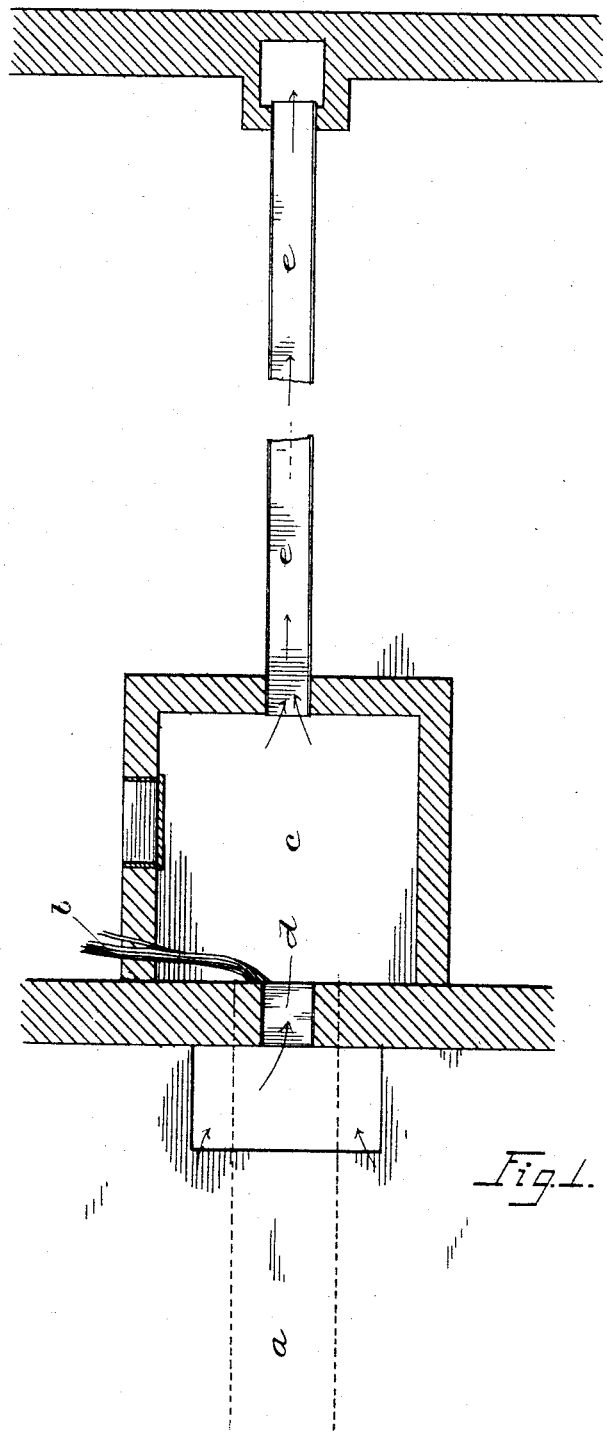
Figure 2:
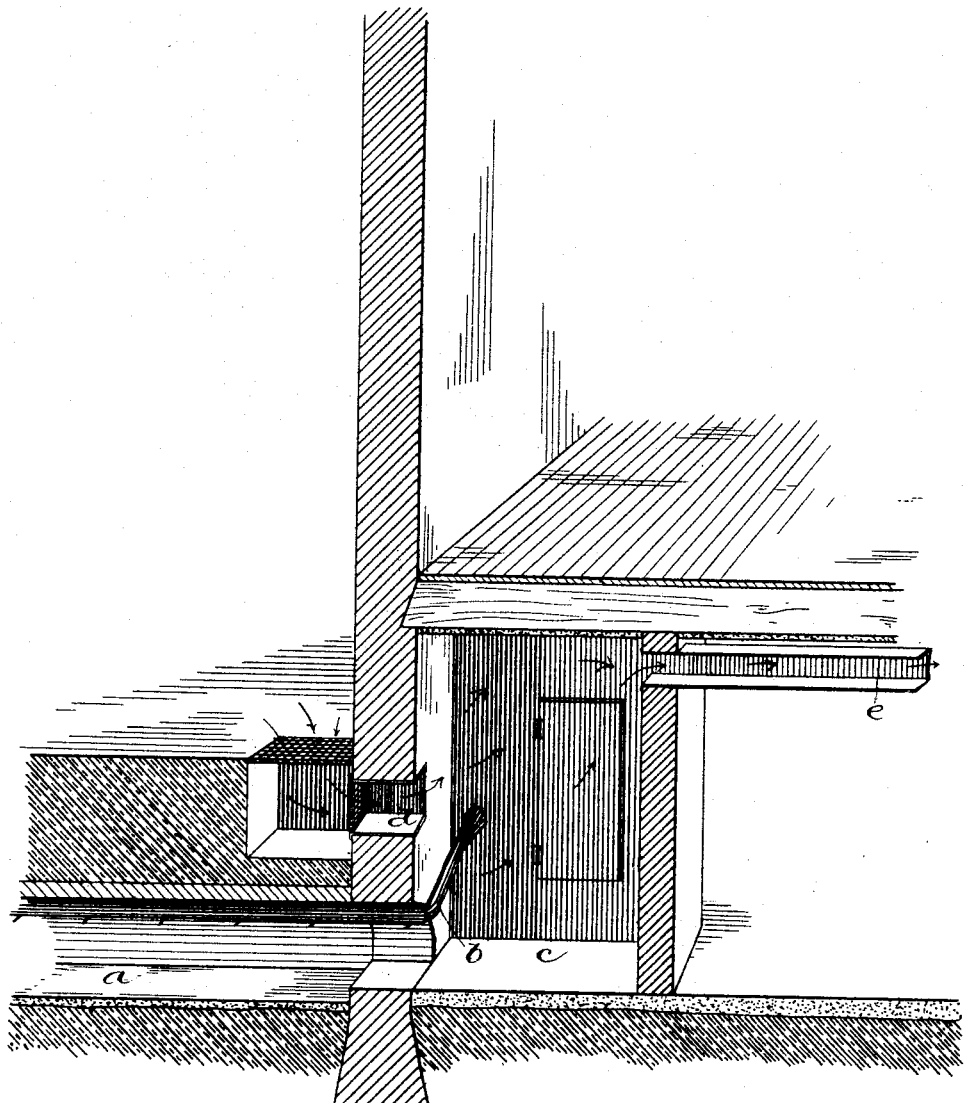

Figure 1 is a plan showing the end of a conduit connected with the chamber, the electric cables carried through one of the walls of the chamber, and the air inlet and outlet. Fig. 2 is a vertical sectional view thereof.

Like parts are indicated by similar letters of reference throughout the different figures.

It will be understood that the tunnel or conduit $a$ is laid from some main conduit of the system, and is designed to carry the necessary conductors $b$ for a given building. This conduit $a$ opens into the chamber or apartment $c$. A door may be provided, as shown, so that entrance may be had to the chamber. The cables $b$ are carried through the walls or sides of the chamber in any convenient manner, all spaces about the cables as they pass through the walls being made practically air-tight, so that there may be no escape of gas into the building. I provide an opening $d$ from the chamber to the outside air, a suitable grate and screen being placed therein for reasons well understood. I provide also a vent $e$, which connects with a flue leading, preferably, to the top of the building. This flue is preferably one of a stack of chimneys, so that it may be heated, thus causing a strong draft of air through the chamber, as indicated by the arrows in Fig. 2. Any gas which may enter the chamber will thus be carried off through the flue. The gas in the conduits is also caused to circulate, and dangers from explosions throughout the system, as well as in the building, are avoided, while at the same time any annoyance from small quantities of gas entering the building is prevented. It is of importance to cause the gases throughout the system of conduits to circulate, since they are usually of such specific gravity that ventilation at the man-holes does not have the desired effect.

I have described my invention as applied to one special conduit leading from the main system to a special building. There will be many such special conduits in the system, and I preferably provide each with my apparatus, thus more effectually preventing the gases from remaining in the conduits.

My invention has been applied to the Chicago system of underground conduits, and has been found not only to prevent the explosions in the building for which it is specially designed, but also to be beneficial throughout the system, since no explosions have taken place at the man-holes or at other buildings connected with the same system since my invention was applied at one building. Moreover, the injury to the cables heretofore caused by the action of gases have practically ceased.

It is evident that my invention admits of various modifications, that would readily suggest themselves to those skilled in the art; and I therefore do not limit myself to the precise details of construction shown.

Having thus described my invention, I claim as new and desire to secure by Letters Patent—

1. The combination, with the cables of an underground conduit extending to a building, of a chamber closed to the building, into which chamber the conduit opens, said chamber being provided with an inlet to the outside air and an outlet leading to a flue, substantially as and for the purpose specified.

2. The combination, with the conduit $a$, containing electric conductors, of the chamber $c$, with which said conduit is connected, said chamber being provided with an opening $d$ to the outside air, and an outlet $e$, connected with a heated flue, substantially as and for the purpose specified.

In witness whereof I hereunto subscribe my name this 26th day of February, A. D. 1889.

DAVID M. HYLAND.

Witnesses:
GEORGE P. BARTON,
ELLA EDLER.